United States Patent Office 3,573,970
Patented Apr. 6, 1971

3,573,970

METHOD FOR DEPOSITING Os FILMS

Robert C. Langley, Millington, N.J., assignor to Engelhard Minerals & Chemicals Corporation, Newark, N.J.

No Drawing. Filed Apr. 16, 1969, Ser. No. 816,812
Int. Cl. C03c *17/06;* C23c *3/04*
U.S. Cl. 117—119 12 Claims

ABSTRACT OF THE DISCLOSURE

Osmium tetroxide-olefin complex compounds soluble in organic film-forming media are used for preparing osmium films.

BACKGROUND OF THE INVENTION

This invention relates to a method of forming a thin adherent osmium coating. More particularly it is concerned with the use of osmium tetroxide-olefin complex compounds, soluble in an organic film-forming medium, for preparing osmium-containing pure metal films.

It is an object of the present method to provide a practical method for forming a pure osmium film. Another object is the deposition of the osmium film under relatively mild conditions from an organic medium. A further object is to deposit an alloy of osmium and another metal in the form of a thin adherent film.

The technique of depositing thin films by thermal decomposition of metallo-organic compounds is well known, particularly in the decorative art. Thin films of gold, silver, platinum, palladium, ruthenium, and rhodium have been obtained in this way. While the general concept of depositing films in this way is well known it will be appreciated that for each metal and type of application the specific organic compounds and formulations vary. Heretofore, however, this technique has not been applied for depositing osmium films.

Compared to other precious metals, little work has been done on obtaining osmium films. One reason is that the metal is relatively scarce; another the metal is expensive. However, osmium tetroxide is used in organic synthesis as a catalyst or reactant. A well known reaction of osmium tetroxide is the ease with which it adds to carbon-carbon double bonds to form a glycol type bond:

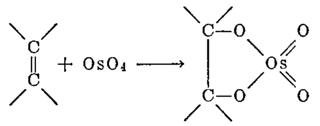

In aqueous systems the osmium tetroxide-olefin complex is cleaved with relative ease, e.g. in hydroxylation reactions, regenerating the $O_sO_4$. Osmium tetroxide presents a handling problem in that it is highly volatile and highly toxic.

For use in depositing a film, the organic osmium compound must be non-volatile, soluble in organic solvents, relatively easy to decompose, and must decompose completely to give an osmium film free from impurities. Surprisingly it was found that an osmium tetroxide-olefin complex compound could be formed as a relatively stable compound in organic media and then be decomposed in an inert or reducing atmosphere under relatively mild conditions to produce a pure osmium film without regeneration and volatilization of osmium as the tetroxide. Decomposition in the absence of oxygen is necessary to prevent loss of the metal as the tetroxide. Because of the compatibility of the film forming system of the present invention with other well known metallo-organic formulations for preparing other precious metal and base metal films by thermal decomposition, the present formulations can be used in preparing films which are co-deposits of osmium and a second metal, e.g. iridium, ruthenium, platinum, palladium, rodium, nickel, and the like. Under certain conditions and in certain proportions alloys may be formed.

In accordance with this invention an osmium tetroxide-olefin compound dissolved in a film forming organic medium is applied to a substrate and then the applied coating is heated in an oxygen free atmosphere to remove the organics and deposit an osmium film.

The osmium tetroxide-olefin compounds useful for this invention are readily formed at room temperature and pressure. Since the osmium tetroxide is difficult to handle and since the reaction between the osmium tetroxide and the olefin may be highly exothermic, it is preferred to first dissolve the tetroxide in an organic solvent preferably a solvent compatible with an organic film forming system. Hydrocarbons, chloroform, ethers, esters, higher alcohols and mixtures thereof are examples of the solvents that may be used. Chloroform, t-butyl alcohol, t-octylamine are preferred solvents in that they are compatible with and readily removed from the system.

As noted above, the osmium tetroxide reacts readily with olefins. For use in the method of this invention the olefin selected must be compatible with a film forming organic medium. The olefin may be aliphatic, aromatic or cyclic, but it should have at least 4 carbons since osmium tetroxide compounds of lower olefins are usually not sufficiently soluble in the film forming systems. Preferably the compounds are branched since this aids in the solubility. Olefins having more than 18 carbons may be used, however, the metal concentration of the solutions is too limited when larger olefins are used. It is also preferred to have a system in which the osmium is linked by only two oxygens to a single carbon-carbon double bond; otherwise polymerization tends to occur. For this reason the preferred olefins have only a single carbon to carbon bond and the concentration of the olefin in the formulation is limited to a slight excess over the stoichiometric amount required to form the compound represented by

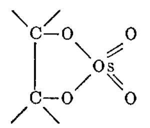

Examples of suitable olefins are terpenes, fatty acids, octylenes, and decylenes. As noted above the preferred olefins have 4 to 18 carbons and are monounsaturated. Terpenes falling within this category, e.g. pinene, are especially preferred, because the terpenes have good film forming characteristics.

In the discussion above reference has been made to organic film forming systems. It will be appreciated that such systems are well known in the art. The film forming vehicles impart certain physical characteristics to the formulation such as oiliness, viscosity, evaporation rate, surface tension and tack and on being subjected to the firing temperature are completely driven off leaving no ash or residue. The choice of vehicle depends largely on the method of application and firing and on the substrate. It is possible to have a single film forming vehicle or a mixture of compounds, and in some circumstances the solvents for the osmium tetroxide, e.g. chloroform or t-octylamine, also serve as the film forming component of the formulation. However, mixtures of simple solvents and one or more of a wide variety of natural or synthetic organic compounds may be present as the film forming component of the formulation. Organic film forming vehicles have been described in the literature and patents, for example, in U.S. Pat. No. 2,994,614 and No. 3,313,-632.

The osmium tetroxide-olefin compound dissolved in the film forming medium is applied to a substrate and the coating is subjected to elevated temperature in an oxygen-free atmosphere, e.g. $H_2$, $N_2$, or annealing gas, to drive off the organics and deposit an osmium film. The temperature at which the coating is fired depends on the formulation used and the duration of the treatment. Generally the film is deposited at a temperature in the range of about 200°–1000° C. Typically, a pure osmium film is deposited from an osmium tetroxide-pinene formulation in a hydrogen atmosphere at a temperature of 300° C. in about five minutes.

In accordance with another aspect of this invention the osmium tetroxide-olefin formulation contains an organic compound of a second metal other than osmium and on subjecting a coating of this formulation to elevated temperature in an oxygen free atmosphere the osmium and the second metal co-deposit. Examples of metals that may be co-deposited with osmium are iridium, ruthenium, platinum, palladium, rhodium, nickel and the like, and combinations thereof. As noted above, under certain circumstances alloys of osmium are formed. For example, by heating a formulation of this invention containing an equivalent of 90% osmium and 10% iridium, by weight, to a temperature of 300° C., a homogeneous co-deposit of the metals is formed. In order to alloy the co-deposited osmium and iridium, higher temperatures e.g. about 800° C. and higher are required.

The osmium and osmium alloy films prepared according to this invention are esthetically appealing, highly reflective, and electrically conductive and can be used, for example, as reflectors of visible and infrared energy capable of operating at elevated temperature or as electrical conductors or resistors stable at extremely high temperature. Osmium alloys, e.g. Os-Ir, are useful as very hard conductive coatings having great resistance to wear when used with sliding contacts.

The following examples are merely illustrative of embodiments of the present invention and should not be construed as limitations thereof.

EXAMPLE 1

$OsO_4$-alpha-pinene

A solution containing 3.76% osmium was prepared by dissolving 0.54 grams of $OsO_4$ and 0.318 gram of alpha-pinene in chloroform. The chloroform solution was then applied to glass slides by dipping and the slides were fired in $H_2$ to 300° C. The metal film was identified by X-ray and electron diffraction patterns as substantially pure osmium. The osmium films were about 1000 angstroms thick and very conductive having a resistance of about 40 ohms over a ½ inch span. Substantially quantitative yields of Os are obtained which appears to indicate that the initial cleavage occurs at the O—Os bonds rather than the C—O bonds, which would result in loss of metal as the volatile tetroxide.

Identical results were obtained with this compound when fired to 300° C. in an atmosphere of $N_2$.

Alpha-pinene is a monocyclic terpene and is a monounsaturated compound.

EXAMPLE 2

$OsO_4$-dextro-limonene

A solution containing 2.62% osmium was prepared by dissolving 0.50 gram of $OsO_4$ in 20 ml. of cyclohexane and 0.54 gram of di-limonene in 10 ml. of cyclohexane was added to this mixture. After standing at ambient temperature several days, the precipitate was separated and dissolved in chloroform to give a working solution containing 2.62% osmium. The solution was brushed on glass slides and fired gradually in a $H_2$ atmosphere to 300° C. to give a substantially pure osmium film.

In a similar manner the precipitate from the reaction of $OsO_4$ with di-limonene was dissolved in oil of peppermint. This working solution was then brushed on glass slides and fired gradually to 325° C. in $H_2$. These samples gave substantially pure osmium films, as determined by electron diffraction, of about 400 angstroms thickness. As in Example 1, the yield of osmium was quantitative and the films resembled platinum films of this thickness.

Dextro-limonene, a terpene, is a cyclic diene. Although useful for this process, the osmium limonene glycolate solutions have a short shelf life since they tend to polymerize on standing.

EXAMPLE 3

Osmium-iridium film

A chloroform solution of osmium pinene glycolate (3.76% Os) was mixed with a chloroform solution of iridium sulforesinate (6% Ir) in weight ratio of 1.10 to 0.077. The resultant solution was brushed on a quartz slide which was fired gradually to 500° C. in hydrogen. An electrically conductive film containing Os:Ir 90:10 by weight, resulted.

It will be obvious to those skilled in the art that many modifications may be made within the scope of the present invention without departing from the spirit thereof, and the invention includes all modifications.

What is claimed is:

1. A method of depositing osmium on a substrate comprising providing a coating composition containing an osmium tetroxide-olefin complex compound dissolved in an organic film forming medium on a surface and heating the coating in an oxygen-free atmosphere to remove the organics and deposit an osmium film.

2. A method of claim 1 wherein the coating is heated to a temperature of 200° to 1000° C.

3. A method of claim 1 wherein the olefin is a compound having 4 to 18 carbons.

4. A method of claim 3 wherein said olefin is a terpene.

5. A method of claim 4 wherein the terpene has a single unsaturated carbon-carbon bond.

6. A method of claim 5 wherein the terpene is pinene.

7. A method of claim 1 wherein the coating composition contains a metallo-organic compound of a second metal, said second metal being a metal other than osmium, and on heating the coating osmium and the second metal are co-deposited.

8. A method of claim 7 wherein the second metal is a member of the group consisting of iridium, ruthenium, platinum, palladium, rhodium and nickel and combinations thereof.

9. An osmium film forming composition comprising an organic solution containing an osmium tetroxide-olefin complex compound dissolved in an organic film forming medium.

10. An osmium film forming composition of claim 9 wherein the olefin has 4 to 18 carbons.

11. An osmium film forming composition of claim 10 wherein the olefin is a terpene.

12. An osmium film forming composition of claim 11 wherein the terpene has a single unsaturated carbon-carbon bond.

References Cited

UNITED STATES PATENTS

| | | | |
|---|---|---|---|
| 3,265,526 | 8/1966 | Beer | 117—160X |
| 3,434,879 | 3/1969 | Langley | 117—160X |
| 3,515,563 | 6/1970 | Hodoley et al. | 106—1 |

ALFRED L. LEAVITT, Primary Examiner

J. R. BATTEN, Jr., Assistant Examiner

U.S. Cl. X.R.

106—1; 117—124, 160, 227, 229; 252—514